(12) United States Patent
Tian et al.

(10) Patent No.: US 9,204,492 B2
(45) Date of Patent: Dec. 1, 2015

(54) METHOD AND SYSTEM SUPPORTING HANDOVER FROM MACRO NODE B TO HOME NODE B

(75) Inventors: Yirong Tian, Xiaguangli (CN); Kwong Joong Kim, Xiaguangli (CN); Zhenwei Shi, Xiaguangli (CN); Teizhu Zhao, Xiaguangli (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 684 days.

(21) Appl. No.: 12/988,412

(22) PCT Filed: Apr. 16, 2009

(86) PCT No.: PCT/KR2009/001961
§ 371 (c)(1),
(2), (4) Date: Dec. 10, 2010

(87) PCT Pub. No.: WO2009/128656
PCT Pub. Date: Oct. 22, 2009

(65) Prior Publication Data
US 2011/0090869 A1   Apr. 21, 2011

(30) Foreign Application Priority Data

Apr. 16, 2008   (CN) .......................... 2008 1 0092284

(51) Int. Cl.
*H04W 92/22* (2009.01)
*H04W 24/10* (2009.01)
*H04W 28/18* (2009.01)
*H04W 36/08* (2009.01)
*H04W 48/08* (2009.01)
*H04W 76/02* (2009.01)

(52) U.S. Cl.
CPC .............. *H04W 92/22* (2013.01); *H04W 24/10* (2013.01); *H04W 28/18* (2013.01); *H04W 36/08* (2013.01); *H04W 48/08* (2013.01); *H04W 76/02* (2013.01)

(58) Field of Classification Search
None
See application file for complete search history.

(56) References Cited

U.S. PATENT DOCUMENTS

| | | | | |
|---|---|---|---|---|
| 6,438,117 B1 * | 8/2002 | Grilli et al. | ..................... | 370/331 |
| 6,445,917 B1 * | 9/2002 | Bark et al. | ..................... | 455/423 |
| 6,542,744 B1 * | 4/2003 | Lin | ................ | 455/437 |
| 6,879,830 B1 * | 4/2005 | Vollmer et al. | ............... | 455/442 |
| 7,035,676 B2 * | 4/2006 | Ranta | ............................ | 455/574 |
| 7,539,161 B2 * | 5/2009 | Bolin et al. | .................... | 370/329 |
| 7,796,556 B2 * | 9/2010 | Andersson et al. | ........... | 370/332 |

(Continued)

OTHER PUBLICATIONS

R2-072382, 3GPP TSG-RAN WG2 Meeting #58, Orlando, U.S.A., Jun. 25-29, 2007.*

*Primary Examiner* — Dung B Huynh
(74) *Attorney, Agent, or Firm* — Jefferson IP Law, LLP

(57) ABSTRACT

A method for supporting handover from macro Node B to home Node B is proposed according present invention, comprising: informing, by a source radio network control node of a UE1 the UE of configuration parameters of a cell to be measured and indicating the UE to report a unique ID of the measured cell; measuring, by the UE, a signal from the home Node B, and after reading the home Node B's unique ID from the home Node B's system information, reporting the measurement result to said source radio network control node of the UE, said measurement result including the home Node B's unique ID; and sending, by said source radio network control node, a message to a destination radio network control node of said home Node B specified by said unique ID, so that the destination radio network control node can establish radio bearer in the home Node B for the UE.

15 Claims, 3 Drawing Sheets

(56) References Cited

U.S. PATENT DOCUMENTS

| | | |
|---|---|---|
| 7,995,994 B2 * | 8/2011 | Khetawat et al. ............. 455/410 |
| 8,355,725 B2 * | 1/2013 | Nylander et al. ............. 455/442 |
| 2002/0045448 A1 * | 4/2002 | Park et al. ................... 455/436 |
| 2002/0051431 A1 * | 5/2002 | Choi et al. ................... 370/331 |
| 2003/0119452 A1 * | 6/2003 | Kim et al. ..................... 455/69 |
| 2003/0157927 A1 * | 8/2003 | Yi et al. ...................... 455/411 |
| 2004/0068571 A1 * | 4/2004 | Ahmavaara ................. 709/228 |
| 2004/0121770 A1 | 6/2004 | Tigerstedt et al. |
| 2004/0137902 A1 | 7/2004 | Chaskar et al. |
| 2004/0162072 A1 * | 8/2004 | Sigle et al. ................... 455/436 |
| 2005/0088992 A1 * | 4/2005 | Bolin et al. ................... 370/329 |
| 2005/0148297 A1 * | 7/2005 | Lu et al. ...................... 455/3.06 |
| 2005/0221824 A1 * | 10/2005 | Lee et al. .................... 455/435.2 |
| 2005/0255851 A1 * | 11/2005 | Schreiber ..................... 455/453 |
| 2006/0128399 A1 * | 6/2006 | Duan et al. .................. 455/456.5 |
| 2007/0037576 A1 * | 2/2007 | Subramanian et al. ....... 455/436 |
| 2007/0218906 A1 | 9/2007 | Melia et al. |
| 2007/0254620 A1 * | 11/2007 | Lindqvist et al. ............ 455/403 |
| 2008/0039092 A1 * | 2/2008 | Kitazoe ....................... 455/436 |
| 2008/0076425 A1 * | 3/2008 | Khetawat et al. ............ 455/436 |
| 2008/0081636 A1 * | 4/2008 | Nylander et al. ............ 455/452.2 |
| 2008/0096566 A1 * | 4/2008 | Brunner et al. .............. 455/437 |
| 2008/0102794 A1 * | 5/2008 | Keevill et al. ................ 455/411 |
| 2008/0102837 A1 * | 5/2008 | Li et al. ....................... 455/436 |
| 2008/0132239 A1 * | 6/2008 | Khetawat et al. ............ 455/438 |
| 2009/0061821 A1 * | 3/2009 | Chen et al. .................. 455/411 |
| 2009/0098873 A1 * | 4/2009 | Gogic .......................... 455/436 |
| 2009/0176479 A1 * | 7/2009 | Vikberg et al. .............. 455/406 |
| 2010/0029278 A1 * | 2/2010 | Fang et al. ................... 455/436 |
| 2010/0040019 A1 * | 2/2010 | Tinnakornsrisuphap et al. ............................. 370/331 |
| 2010/0046433 A1 * | 2/2010 | Iwamura et al. ............. 370/328 |
| 2010/0069073 A1 * | 3/2010 | Chen et al. .................. 455/437 |
| 2010/0069088 A1 * | 3/2010 | Fischer ....................... 455/456.1 |
| 2010/0130199 A1 * | 5/2010 | Piercy et al. ................ 455/434 |
| 2010/0195621 A1 * | 8/2010 | Kekki et al. ................. 370/332 |
| 2010/0197311 A1 * | 8/2010 | Walldeen et al. ............ 455/444 |
| 2010/0203891 A1 * | 8/2010 | Nagaraja et al. ............ 455/436 |
| 2010/0208700 A1 * | 8/2010 | Shi et al. ..................... 370/331 |
| 2011/0014920 A1 * | 1/2011 | Nylander et al. ............ 455/442 |
| 2011/0019638 A1 * | 1/2011 | Hamel et al. ................ 370/331 |
| 2011/0021240 A1 * | 1/2011 | Hiltunen et al. ............. 455/522 |
| 2011/0090864 A1 * | 4/2011 | Nylander et al. ............ 370/331 |
| 2011/0244858 A1 * | 10/2011 | Callender .................... 455/436 |
| 2011/0294509 A1 * | 12/2011 | Kim et al. .................... 455/436 |

* cited by examiner

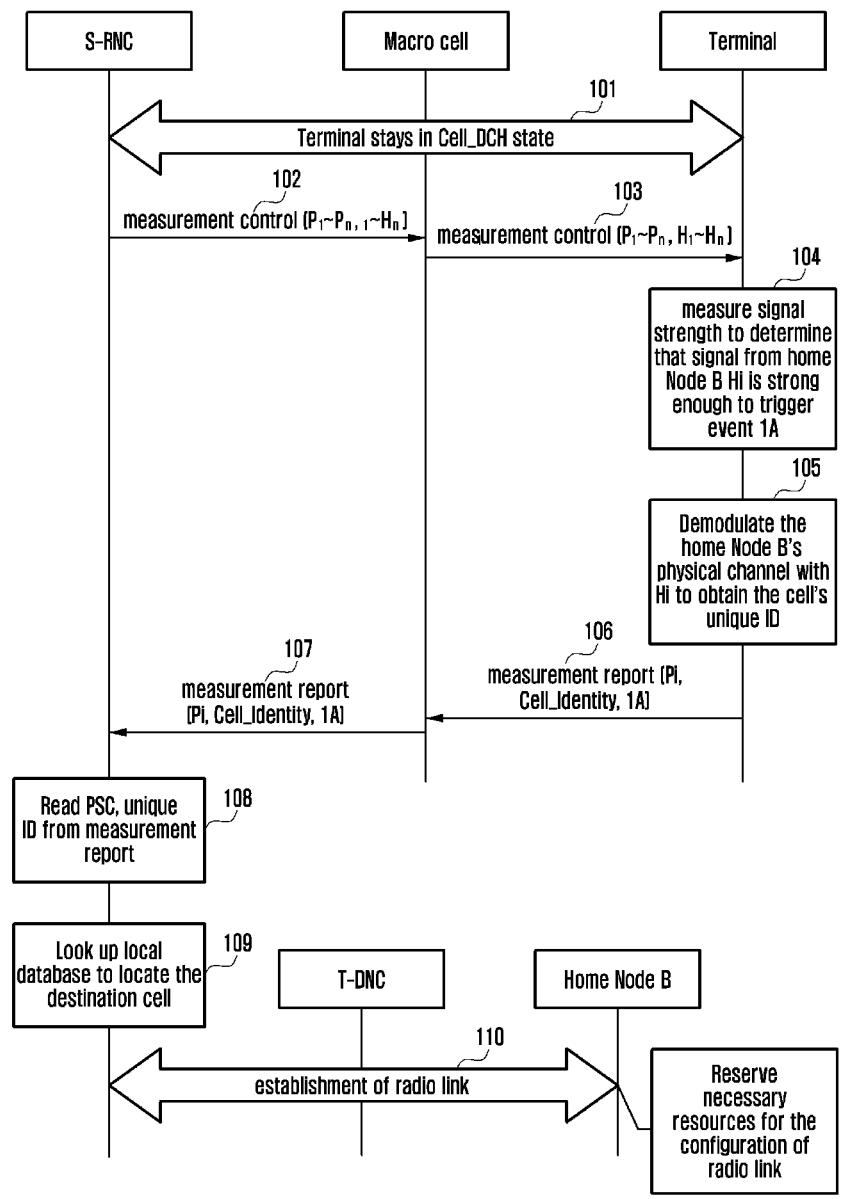

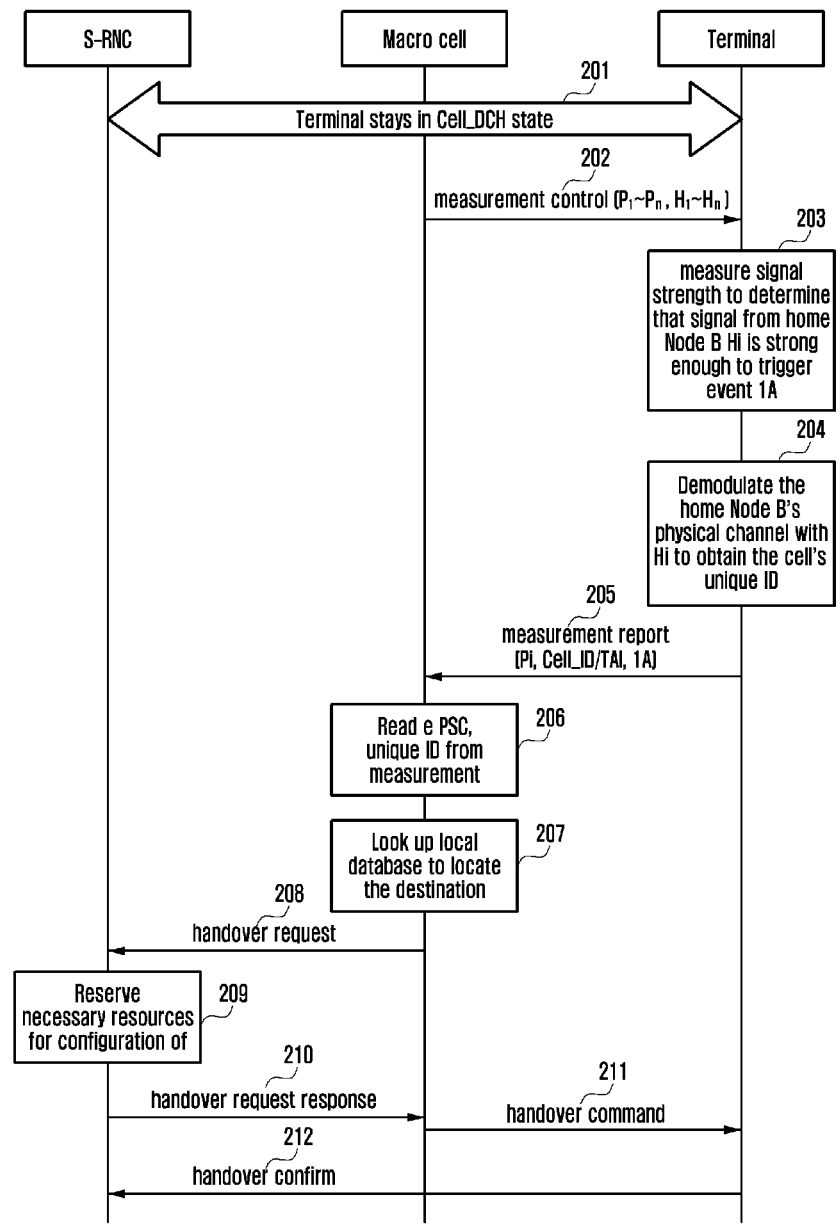

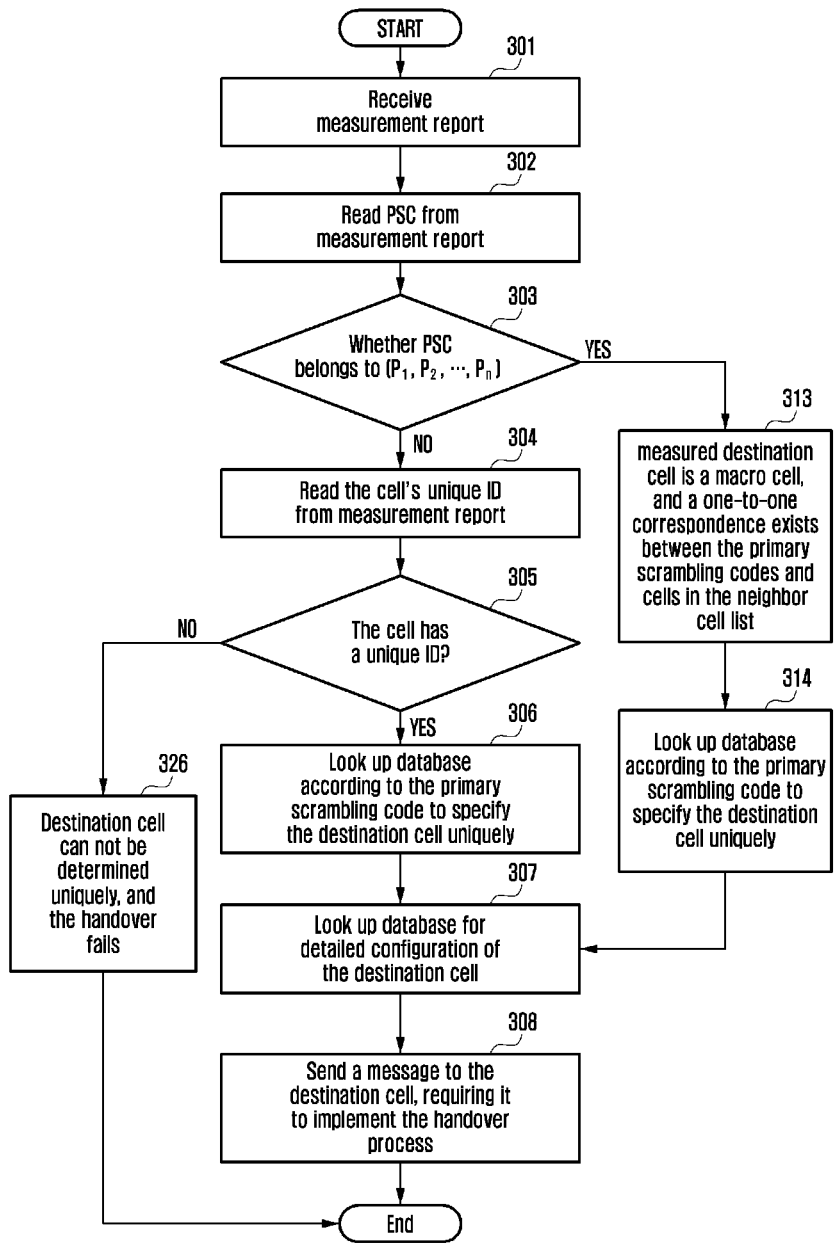

METHOD AND SYSTEM SUPPORTING HANDOVER FROM MACRO NODE B TO HOME NODE B

BACKGROUND OF THE INVENTION

1. Field of Invention

The present invention relates to the field of wireless communication, in particular to method and system supporting handover from macro Node B to home Node B which enables the home Node B to be better incorporated into conventional wireless mobile networks.

2. Description of Prior Art

In a wireless mobile network system, indoor coverage always plays tough for network operators. On the other hand, demand for superior indoor coverage is getting stronger. It has become a critical issue about how to effectively settle the contradiction between indoor coverage and capacity while satisfying requirements of voice and data services. This requires any necessary solution for wireless network coverage. Meanwhile, there is technical tendency and demand for the incorporation of the wireless mobile network technique and other techniques.

Such tendency and demand give birth to home Node B, which is a new type of Node B with small volume and light weight and can be placed anywhere indoor according to a user's requirement. RJ45 is adopted as the physical interface of the home Node B. Through network wire, it communicates with RNC by bearing mobile network protocol on TCP/IP protocol. Therefore, the home Node B integrates the mobile network with the Internet and thus extends the mobile network's Node B into homes, so that mobile network's coverage and service are broadened. An indoor user can occupy the entire radio resources of the home Node B. The home Node B is an important stage in the evolution of future network integration.

Since a home Node B is an indoor small base station, it has characteristics, such as greater quantity, smaller coverage area, etc., compared with a conventional macro Node B. So, it is necessary to further perfect techniques and methods for handover from macro Node B to home Node B. And in present invention, a method for supporting handover from macro Node B to home Node B is proposed.

Since the home Node B is novel, the handover from macro Node B to home Node B is a hot spot in study and research.

A conventional macro Node B has characteristics of wider coverage, fixed site location, static configuration and no changes after service accessing. The characteristics of wider coverage and fixed site location impose a limit on the number of neighboringing cells to the macro Node B. So, there exists no case where different neighboring cells share the same scrambling code. In other words, Pi in the following neighboring cell list are different from one another.

| No. | Primary scrambling codes | Cell_ID | ... | ... |
|---|---|---|---|---|
| 1 | $P_1$ | 15014 | ... | ... |
| 2 | $P_2$ | 10064 | ... | ... |
| ... | ... | ... | ... | ... |
| N | $P_n$ | 07128 | ... | ... |

In addition, thanks to static configuration, the engineering staff can manually configure an neighboring cell list for every cell according to the network planning in the initial stage of network establishment. Once the configuration has been done, it is generally not necessary to make any change to the established network. Basically, there will be no change. After the network is put into operation, RNC looks up the neighboring cell list according to the primary scrambling code $P_i$ contained in a measurement control message reported from a terminal so as to uniquely specify the corresponding cell's Cell_ID.

However, great change has been taken place after the home Node B is introduced. The home Node B is intended to offer services to home subscribers. That means home Node B can access or exit services at any time. In this way, the home Node Bs surrounding a macro Node B are continuously changing. It is impossible to manually configure the neighboring cell list for a macro Node B in the initial stage of the network construction, since a lot of home Node Bs may locate around one macro Node B, and the reuse of a primary scrambling code may happen among these home Node Bs. If a home Node B is not yet configured in the neighboring cell list of the macro Node B, a terminal will not measure a corresponding signal from the home Node B. Therefore, the UE can not handover from the macro Node B to home Node B, or even can not implement cell reselection normally.

In real applications, the operators hope to implement the function of handover from a macro Node B to a home Node B so as to guarantee the call service quality and service requirement for enterprises. By far, no final scheme on the handover from macro Node B to home Node B has been specified by any relevant standardization organization. No perfect solution is figured out to settle this problem. How to implement the handover from macro Node B to indoor small Node B becomes a hot spot to operators and equipment providers.

As described above, the neighboring cell list of a macro Node B in conventional network is configured manually according to the network planning and can not be updated automatically. So, it is impossible for a macro Node B to add or delete the information on a home Node B into/from the neighboring cell list in real time, since a home Node B cell is possibly established or removed arbitrarily. In this case, UEs in the macro Node B can not detect any signal from the home Node B, and thus they can not handover from the macro Node B to the home Node B. Similarly, trouble occurs at cell reselection.

By far, no final scheme on the handover from macro Node B to home Node B has been specified by any relevant standardization organization. No perfect implementation design has been proposed by any company. During the commercial application of home Node B, it is yet not possible to implement handover from macro Node B to home Node B. It is challenging to users who get used to common communication mode of handover. And also, the operators hesitate to accept home Node B. These facts greatly affect the application and popularization of home Node B.

Even if the macro Node B could update the neighboring cell list in real time, problems may rise during the addition or deletion of neighboring cells according to the access condition of home Node B. Some companies have proposed such method that when a home Node B powers on, the macro Node B's neighboring cell list is updated automatically so that the information of the accessing home Node B can be added to the macro Node B's neighboring cell list. This scheme may be effective in the case of a small number of home Node Bs which are not widely applied. Since a home Node B is in unit of home, having a small coverage area, and there are usually a great number of home Node Bs, many problems may occur during the commercialization of the home Node B. Examples of problems are listed below.

A) There is generally a high density of home Node Bs located in the coverage of a macro Node B. If all the home Node Bs were added to the neighboring cell list of the macro Node B, the neighboring cell list would be very cumbersome and exceed the upper limit regulated in the existing rule (e.g., at most 32 co-frequency neighboring cells and at most 32 hetero-frequency neighboring cells).

B) To break the limit of 32 neighboring cells, it is necessary to modify SIM (subscriber identity module) card. This will cause the most and even unacceptable effect to users. In addition, the memory capacity of SIM is limited. Even though the limit of 32 neighboring cells could be broken, if a lot of home Node Bs locate within the coverage of a macro Node B, reuse of a primary scrambling code will happen among part of the home Node Bs. For a conventional macro cell, each primary scrambling code in the neighboring cell list is uniquely allocated. Therefore, the macro cell can determine a Node B corresponding to the unique primary scrambling code reported from a terminal. If reuse of a primary scrambling code happens, the handover from the macro Node B to a home Node B would fail, for the macro Node B could not distinguish which home Node B the UE should be switched to according to such reused primary scrambling code, when the UE initiates the handover process.

C) Frequent access or exit of home Node Bs may result in waste of system resource, since the macro Node B has to frequently update the neighboring cell list and thus great deal of signaling is generated. If bursts of great deal of signaling arrive at the system at the same time, heavy system burden will be a great challenge to the capacity of existing system, and even affect the existing system's normal operation of fundamental services.

The problems mentioned above can be easily triggered in commercial network environment. Thus, the problem of handover from macro Node B to home Node B can not be well settled for commercial networks, with the method of updating the macro Node B's neighboring cell list in real time.

SUMMARY OF THE INVENTION

In present invention, method and system supporting handover from macro Node B to home Node B is proposed to settle the problem of handover from macro Node B to home Node B in current wireless mobile communication systems. With this method and system, home Node Bs can be better incorporated into current wireless mobile networks.

To achieve the above object, a method for supporting handover from macro Node B to home Node B is proposed according present invention, comprising: informing, by a source radio network control node of a user equipment (UE), the UE of configuration parameters of a cell to be measured and indicating the UE to report a unique ID of the measured cell; measuring, by the UE, a signal from the home Node B, and after reading the home Node B's unique ID from the home Node B's system information, reporting the measurement result to said source radio network control node of the UE, said measurement result including the home Node B's unique ID; and sending, by said source radio network control node, a message to a destination radio network control node of said home Node B specified by said unique ID, so that the destination radio network control node can establish radio bearer in the home Node B for the UE.

Preferably, both the source and destination radio network control nodes are radio network controllers in Universal Mobile Telecommunication System (UMTS) or evolved Node Bs (eNBs) in Long-term Evolution (LTE) System.

Preferably, the source radio network control node and the destination radio network control node are one same physical entity.

Preferably, the said configuration parameters include a set of primary scrambling codes identifying the macro Node B and a set of primary scrambling codes identifying the home Node B.

Preferably, the measurement result also includes a primary scrambling code identifying the home Node B.

Preferably, the primary scrambling code identifying the home Node B are a primary scrambling code from the set of primary scrambling codes reserved and dedicated for the home Node B.

Preferably, the unique ID of the home Node B is a cell ID in UMTS, or a tracking area ID(TAI) or cell ID in LTE system.

In another aspect of the present invention, a method for supporting handover from macro Node B to home Node B is proposed, comprising: informing, by a source radio network control node of a user equipment (UE), the UE of configuration parameters of a cell to be measured and indicating the UE to report a unique ID of the measured cell; receiving, by said source radio network control node, measurement result reported from the UE, said measurement result including the home Node B's unique ID; and sending, by said source radio network control node, a message to a destination radio network control node of said home Node B specified by said unique ID, so that the destination radio network control node can establish radio bearer in the home Node B for the UE.

Further, a system for supporting handover from macro Node B to home Node B is proposed according to present invention. It comprises: a source radio network control node of a user equipment (UE) for informing the UE of configuration parameters of a cell to be measured and indicating the UE to report a unique ID of the measured cell; the UE for measuring a signal from the home Node B, and after reading the home Node B's unique ID from the home Node B's system information, reporting the measurement result to said source radio network control node of the UE, said measurement result including the home Node B's unique ID; and a destination radio network control node of the home Node B identified by said unique ID for receiving a message from said source radio network control node so as to establish radio bearer in the home Node B for the UE.

BRIEF DESCRIPTION OF THE DRAWINGS

The above object, advantages and features of the present invention will become apparent with reference to the detailed descriptions of preferred embodiments of present invention in conjunction with the following figures, in which:

FIG. 1 shows a signaling flowchart for handover from macro Node B cell to home Node B cell between RNC of a WCDMA system according to an embodiment of the present invention;

FIG. 2 shows a signaling flowchart for handover from macro Node B cell to home Node B cell in an LTE system according to an embodiment of the present invention; and FIG. 3 shows an operation flowchart of RNC or eNB according to an embodiment of the present invention.

DETAILED DESCRIPTION OF PREFERRED EMBODIMENTS

The main idea of the present invention will be described at first.

1. In the stage of network planning, a set of primary scrambling codes ($H_1, H_2, \ldots, H_m$) is allocated for dedicated use by home Node Bs. All of home Node Bs will select and reuse primary scrambling codes from the specified set.

2. Since the number of primary scrambling codes available to the home Node Bs is limited in step 1, the number of neighboring cells to be added is accordingly restricted for a macro cell. In this way, the primary scrambling codes ($H_1$, $H_2$, ..., $H_m$) dedicated to the home Node Bs are added as neighboring cells to the neighboring cell list at the time of configuring the macro cell. And the unique ID of each cell, such as Cell_ID is marked with a special ID (e.g., FFFF).

| No. | Primary scrambling codes | Cell_ID | ... | ... |
|---|---|---|---|---|
| 1 | $P_1$ | 15014 | ... | ... |
| 2 | $P_2$ | 10064 | ... | ... |
| ... | ... | ... | ... | ... |
| N | $P_n$ | 07128 | ... | ... |
| N + 1 | $H_1$ | FFFF | ... | ... |
| ... | ... | ... | ... | ... |
| N + M | $H_m$ | FFFF | ... | ... |

Note:
(N + M) <= 32

3. Since the primary scrambling codes ($H_1$, $H_2$, ..., $H_m$) dedicated to the home Node Bs have been included in the macro Node B's neighboring cell list, the macro Node B includes these home Node B's dedicated primary scrambling codes in a measurement control message in additional to the primary scrambling codes of the original macro neighboring cells around the macro Node B when it sends the measurement control message to a terminal within its coverage. This message informs the terminal to simultaneously measure the primary scrambling codes ($P_1$, $P_2$, ..., $P_n$) and ($H_1$, $H_2$, ..., $H_m$).

4. The terminal measures ambient signals according to the measurement control message. Then, it reports the unique ID of any measured cell when reporting the signal strength of the cell to the macro Node B. According to an embodiment of the present invention, one of the primary scrambling codes ($H_1$, $H_2$, ..., $H_m$) may correspond to several home Node Bs at the same time. To determine which home Node B actually corresponds to the reported primary scrambling code, it is necessary for the terminal to report the unique ID of the destination cell. In this way, during handover, RNC (radio network controller) can look up internally stored data, and then determine the right home Node B according to the primary scrambling code and the unique cell ID.

RNC asks the destination home Node B to reserve resources for handover, and then informs the terminal to implement the handover process.

The present invention involves several entities including a terminal, and UTRAN (UMTS terrestrial radio access network) system in UMTS (universal mobile telecommunication system) or E-UTRAN (evolved UTRAN) in LTE (long-term evolution) system.

For a radio communication system (UTRAN or E-UTRAN), N primary scrambling codes ($H_1$, $H_2$, ..., $H_m$) are specified for home Node Bs in the stage of network planning. When configuring parameters for a macro Node B, ($H_1$, $H_2$, ..., $H_m$) are added to the neighboring cell list of the macro Node B. Since it is impossible to specify the correspondence between each scrambling code of ($H_1$, $H_2$, ..., $H_m$) and each cell in the stage of parameter configuration, the cell is marked with a special ID (e.g., FFFF).

From the aspect of a terminal, since the macro Node B configures ($H_1$, $H_2$, ..., $H_m$) in its neighboring cell list, the measurement control message requires the terminal to measure ($H_1$, $H_2$, ..., $H_m$). In the present invention, the terminal is required to carry the unique cell ID (e.g., the Cell_ID in UMTS radio mobile network or the tracking area ID (TAI) in LTE system, etc.) in its measurement report, in addition to the required PSCs (primary scrambling codes). In this way, when the terminal handover to the home Node B, the RNC obtains the destination cell's primary scrambling code and the cell's unique ID (e.g., the Cell_ID or TAI) according to the measurement report with event 1A. So, it is possible to implement subsequent processes, such as radio link establishing and handover after the destination cell is uniquely determined in conjunction with relevant information in a database.

According to the present invention, handover from macro Node B to home Node B can be implemented with no modification to the name, format and the like of message(s) transferred through common interfaces.

In a WCDMA (wideband code division multiple access) system, handover is divided into two types depending on whether the handover operates across RNC or not. In the following, the handover crossing RNC is taken as an example for description of relevant operation flow in a WCDMA system, as shown in FIG. 1.

1) The terminal obtains the neighboring cell list

101 The terminal establishes voice or data service and stays in DCH state.

102 RNC sends a measurement control message via a dedicated channel to inform the terminal of the primary scrambling codes of the cells to be measured, including both the adjacent macro cells' primary scrambling codes ($P_1$, $P_2$, ..., $P_n$) and the dedicated ones ($H_1$, $H_2$, ..., $H_m$) reserved for home Node Bs.

103 The macro Node B forwards the received measurement control message to the home Node B.

2) The terminal measures signals from the home Node B

104 After receiving the measurement control message from RNC, the terminal learns that it should measure signal strengths of the Node Bs identified by the primary scrambling codes ($P_1$, $P_2$, ..., $P_n$) and ($H_1$, $H_2$, ..., $H_m$). At some moment, the terminal measures that the home Node B $H_i$'s signal strength is high enough, and then the terminal triggers event 1A.

105 The terminal demodulates the physical channel with the scrambling code $H_i$ to obtain the home Node B cell's unique ID (e.g., Cell_ID).

3) The terminal reports the measurement result

106 The terminal reports the measured cell's unique ID (e.g., Cell_ID) and the scrambling code $H_i$ to the upper layer through the physical layer.

The upper layer application encapsulates the measurement report message and sends it to RNC.

107 The macro Node B forwards the measurement report from the terminal to RNC.

4) RNC establishes a radio link to the home Node B, i.e., to establish a radio bearer for the UE.

108 After RNC receives the measurement report from the terminal, it reads out the primary scrambling code H, and the cell's unique ID (Cell_ID or any other ID).

109 RNC looks up a local database according to the unique ID (Cell_ID or any other ID) to obtain configurations of the corresponding destination cell. Then, it determines to which cell a radio link should be established. If no unique ID (e.g., Cell_ID) is contained in the measurement report, RNC can read out only the primary scrambling code PSC. If the primary scrambling code PSC is in the set ($P_1$, $P_2$, ..., $P_n$), the Node B is a conventional one. In this case, RNC can search for the original cell's data in the database. It obtains the destination cell's unique ID (Cell_ID, or any other ID) according to the primary scrambling code PSC. Then it determines the destination cell according to the obtained unique ID.

110 If the destination cell belongs to another RNC and an Iur interface exists between the current serving RNC (S-RNC) and the target DNC (T-DNC) for soft handover, S-RNC will require the home Node B to establish a radio link through the Iur interface.

FIG. 2 shows a handover flow in a LTE system according to the present invention.

201 The terminal establishes voice or data service and stays in DCH state.

202 The macro Node B sends a measurement control message via a dedicated channel to inform the terminal of the primary scrambling codes of the cells to be measured, including both the adjacent macro cells' primary scrambling codes $(P_1, P_2, \ldots, P_n)$ and the dedicated ones $(H_1, H_2, \ldots, H_m)$ reserved for home Node Bs.

203 After receiving the measurement control message from the macro Node B, the terminal learns that it should measure the signal strengths of the Node Bs identified by the primary scrambling codes $(P_1, P_2, \ldots, P_n)$ and $(H_1, H_2, \ldots, H_m)$. At some moment, the terminal measures that the home Node B $H_i$'s signal strength is high enough, and then the terminal triggers event 1A.

204 The terminal demodulates the physical channel with the scrambling code $H_i$ to obtain the home Node B cell's unique ID (e.g., Cell_ID or TAI, etc.).

205 The terminal reports the measured cell's unique ID (e.g., Cell_ID or TAI, etc.) and the scrambling code $H_i$ to its upper layer through the physical layer. The upper layer application encapsulates the measurement report message and sends it to the macro Node B.

206 After RNC receives the measurement report from the terminal, it reads out the primary scrambling code $H_i$ and the cell's unique ID (Cell_ID, TAI or any other ID);

207 RNC looks up the local database according to the unique ID (Cell_ID, TAI or any other ID) to obtain configuration of the corresponding destination cell. Then it determines to which cell a radio link should be established.

208 The macro Node B sends a handover request to the home Node B cell to initiate a handover process.

209 The home Node B cell reserves necessary resources for configuration of the radio link according to the handover request.

210 The home Node B sends a handover request response message to the macro Node B.

211 The macro Node B sends a handover command to the terminal to instruct it to implement the handover process.

212 The terminal performs operations according to the handover command and sends a handover ACK message to the destination home Node B cell.

The internal specific acts of RNC/eNB after receiving the measurement control message may vary depending on specific implementations of different operators and companies. In general, the operation flow can comprises those steps shown in FIG. 3. The sequence of all judgments, how many times a message field is read, etc. can be adjusted for convenience of implementation.

301 RNC/eNB receives the measurement report from the terminal;

302 RNC/eNB reads the primary scrambling code from the measurement report;

303 If the primary scrambling code is not in $(P_1, P_2, \ldots, P_n)$ allocated for macro Node Bs, the measured destination cell is a home Node B.

304 RNC/eNB reads the unique cell ID from the measurement report;

305 If the unique cell ID is included in the measurement report, the destination cell can be specified uniquely, and the implementation of subsequent handover process can be enabled.

306 The address of the network control node to which the destination cell belongs is determined using the read unique cell ID. It is necessary for RNC or eNB to store the correspondence between the unique cell ID and the address of RNC or eNB that controls the cell. Such information can either be stored in RNC or eNB, or be obtained by RNC or eNB looking up a database or a domain name parser.

307 If necessary, the destination cell's detailed configuration is read.

308 RNC/eNB sends relevant message(s) (e.g., "radio link establishment" message [WCDMA], the handover request message [LTE], etc.) to the destination cell's network control node, requiring the destination cell to establish a radio link necessary for handover.

313 If the primary scrambling code in the measurement report of step 303 is determined to be one of $(P_1, P_2, \ldots, P_n)$ for macro Node Bs, the destination cell can be specified uniquely according to the primary scrambling code, since, according to the characteristics of the macro Node B planning, a one-to-one mapping relationship is established between the cells and the primary scrambling codes in the neighboring cell list.

314 The destination cell is determined uniquely by looking up the database according to the macro Node B's primary scrambling code.

326 If the primary scrambling code in the measurement report is one dedicated for home Node B, and no unique cell ID is reported from terminal for the measured cell, the destination cell can not be determined. Therefore, the handover fails.

If no primary scrambling code is reserved for any home Node B in the system, the network will have to consult the unique cell ID to determine the address of eNB or RNC controlling the destination cell.

The primary scrambling code is the unique ID for distinguishing cells within certain coverage in a WCDMA system. However, this ID can be extended to be any of other physical IDs as long as the ID can uniquely determine a cell within the coverage.

The method proposed in the present invention for handover from macro Node B to home Node B has following advantages.

a) In the present invention, it is not necessary to make any modification to names, structures and the like of the common messages through air interface. It does not cause any effect to the existing rule, interconnection and interlink of devices, function, etc.

b) In the present invention, no great modifications are required for the existing network. What is needed is to extract one more message field. So, the implementation is simple and requires less efforts.

c) In the present invention, it is necessary for the terminal to report an optional message field upwards. It will not affect the terminals having no such capability. It is compatible with the existing terminals. For the existing terminals with such capability, what is needed is to upgrade software for the implementation of handover. For modern society in which frequent terminal update happens, the operator can promote the terminals supporting the above handover in various approaches, such as to customize terminals or to wait for the gradually replace of user terminal. So it is convenient to promote this kind of terminal and thus to offer superior services for subscribers.

d) In the present invention, the implementation of handover from macro Node B to home Node B can be realized with much more subscribers' satisfaction. It is very attractive to the subscribers requiring high quality of service.

When operators plan to apply some new technicals, they always much focus on the defects and potential risks of a new product. In the present invention, the technical problem of handover is well settled to enhance the operators' capability of attracting customers and improving customer's importance. With this invention, operators' worries can be eliminated, so that they can be better to promote the application of home Node Bs.

Although the present invention has been described with reference to the preferred embodiments, one skilled in the art will understand that various modifications, substitutions and changes can be made within the scope and spirit of the present invention. Therefore, the present invention is not limited to the above embodiments but defined by the appended claims and equivalents thereof.

What is claimed is:

1. A method for receiving a report of a source radio network control node, the method comprising:
    transmitting, by the source radio network control node, an instruction to read cell information comprising a unique ID and a primary scrambling code of a neighboring cell using identification information of the neighboring cell to a User Equipment (UE);
    receiving the report comprising the unique ID and the primary scrambling code of the neighboring cell from the UE;
    reading the primary scrambling code from the report;
    reading, when the primary scrambling code is not in a set of primary scrambling codes identifying macro Node Bs, the unique ID from the report;
    determining if the neighboring cell has the unique ID;
    specifying a destination cell according to the primary scrambling code if it is determined that the neighboring cell has the unique ID; and
    sending a message to the destination cell to implement a handover process,
    wherein the unique ID comprising the identification information is a non-duplicated ID of the neighboring cell in a Long-Term Evolution (LTE) system, and
    wherein the identification information comprises a set of primary scrambling codes identifying macro Node Bs and a set of primary scrambling codes identifying home Node Bs.

2. The method of claim 1, wherein the source radio network control node and a destination radio network control node are within a Universal Mobile Telecommunication System (UMTS) or evolved Node Bs (eNBs) in a Long-Term Evolution (LTE) System.

3. The method of claim 1, wherein the source radio network control node and a destination radio network control node are one same physical entity.

4. The method of claim 1, wherein the primary scrambling code identifying a home Node B is a primary scrambling code from the set of primary scrambling codes reserved and dedicated for home Node Bs.

5. The method of claim 1, further comprising:
    sending a message to a destination radio network control node specified by the unique ID, so that the destination radio network control node can establish radio bearer for the UE.

6. A method for reporting a report of a User Equipment (UE), the method comprising:
    receiving, by the UE, an instruction to read cell information comprising a unique ID and a primary scrambling code of a neighboring cell from a source radio network control node; and
    reporting the report comprising the unique ID and the primary scrambling code of the neighboring cell to the source radio network control node,
    wherein the unique ID comprising the identification information is a non-duplicated ID of the neighboring cell in a Long-Term Evolution (LTE) system,
    wherein the identification information comprises a set of primary scrambling codes identifying macro Node Bs and a set of primary scrambling codes identifying home Node Bs,
    wherein the source radio network control node is configured to:
        read a primary scrambling code from the report, and
        read, when the primary scrambling code is not in a set of primary scrambling codes identifying macro Node Bs, the unique ID from the report, and
    wherein the source radio network control node is further configured to:
        determine if the neighboring cell has the unique ID,
        specify a destination cell according to the primary scrambling code if it is determined that the neighboring cell has the unique ID, and
        send a message to the destination cell to implement a handover process.

7. The method of claim 6, wherein the source radio network control node and a destination radio network control node are within a Universal Mobile Telecommunication System (UMTS) or evolved Node Bs (eNBs) in a Long-Term Evolution (LTE) System.

8. The method of claim 6, wherein the source radio network control node and a destination radio network control node are one same physical entity.

9. The method of claim 6, wherein the primary scrambling code identifying a home Node B is a primary scrambling code from the set of primary scrambling codes reserved and dedicated for home Node Bs.

10. The method of claim 6, further comprising:
    receiving a message to a destination radio network control node specified by the unique ID, so that the destination radio network control node can establish radio bearer for the UE.

11. A system for supporting transmission and reception of a report, the system comprising:
    a source radio network control node configured to:
        transmit an instruction to read cell information comprising a unique ID and a primary scrambling code of a neighboring cell using identification information of the neighboring cell, to a User Equipment (UE),
        read the primary scrambling code from the report,
        read, when the primary scrambling code is not in a set of primary scrambling codes identifying macro Node Bs, the unique ID from the report,
        determine if the neighboring cell has the unique ID,
        specify a destination cell according to the primary scrambling code if it is determined that the neighboring cell has the unique ID, and
        send a message to the destination cell to implement a handover process,
    wherein the UE is configured to report the report comprising the unique ID and the a primary scrambling code of the neighboring cell to the Node B, wherein the unique ID comprising the identification information is a non-duplicated ID of the neighboring cell in a Long-Term Evolution (LTE) system, and
wherein the identification information comprises a set of primary scrambling codes identifying macro Node Bs and a set of primary scrambling codes identifying home Node Bs to the UE.

12. The system of claim 11, wherein the source radio network control node and a destination radio network control node are within a Universal Mobile Telecommunication System (UMTS) or evolved Node Bs (eNBs) in a Long-Term Evolution (LTE) System.

13. The system of claim 11, wherein the source radio network control node and a destination radio network control node are one same physical entity.

14. The system of claim 11, wherein the primary scrambling code identifying a home Node B is a primary scrambling code from the set of primary scrambling codes reserved and dedicated for home Node Bs.

15. The system of claim 11, wherein the source radio network control node sends a message to a destination radio network control node specified by the unique ID, so that the destination radio network control node can establish radio bearer for the UE.

* * * * *